(12) United States Patent
Dehan et al.

(10) Patent No.: US 6,373,943 B1
(45) Date of Patent: Apr. 16, 2002

(54) MOBILE TELEPHONE WITH AN ARTICULATED COVER AND WITH ROTARY CONTACTS

(75) Inventors: Christophe Dehan; Mickael Klein, both of Le Mans; Herve Le Gallic, Cherreau, all of (FR)

(73) Assignee: Framatome Connectors International, Courbevoie (FR)

( * ) Notice: Subject to any disclaimer, the term of this patent is extended or adjusted under 35 U.S.C. 154(b) by 0 days.

(21) Appl. No.: 09/314,757

(22) Filed: May 19, 1999

(30) Foreign Application Priority Data

May 20, 1998 (FR) .......................................... 98 06409

(51) Int. Cl.[7] ............................................... H04M 1/00
(52) U.S. Cl. .............. 379/433.05; 379/438; 379/433.13
(58) Field of Search ....................... 379/433.05, 433.03, 379/433.13, 438; 455/90, 575

(56) References Cited

U.S. PATENT DOCUMENTS

| 4,755,143 A | 7/1988 | Enomoto et al. ............. 439/31 |
| 5,237,488 A | 8/1993 | Moser et al. ................ 361/729 |
| 5,507,013 A | 4/1996 | Weadon et al. ................ 455/90 |

FOREIGN PATENT DOCUMENTS

| FR | 2 758 929 | 7/1998 |
| GB | 2 264 748 A | 9/1993 |
| WO | WO 96/21988 | 7/1996 |

OTHER PUBLICATIONS

Patent Abstracts of Japan JP 07 006842, Oct. 1, 1995.

*Primary Examiner*—Jack Chiang
(74) *Attorney, Agent, or Firm*—Perman & Green, LLP

(57) ABSTRACT

A mobile telephone including a housing (1) containing an electrical circuit (2) and carrying a cover (3) fastened to the housing in an articulated manner. The telephone also comprises a microphone and rotary contacts incorporated in one of the two joints connecting the cover (3) to the housing (1), in order to make electrical connections between the electrical circuit (2) and the microphone. One of the joints (4a, 4b) articulating the housing on the cover comprises three contacts integral with the housing, namely two lateral contacts (5a) and (5b) and a central contact (5c), each comprising a contact arm (7a), (7b) and (7c). The central contact (5c) bears permanently on a conductive element (9), while the ends of the two lateral contact arms (7a) and (7b) bear elastically on two conductive plates (10). The plates are separated by an insulating material (12) and incorporated in the part (4b) of the joint of the cover (3), in such a way that, when the cover is rotated, the ends of the two contact arms (7a), (7c) ensure that the electrical connection between the electrical circuit (2) and the microphone is switched.

10 Claims, 3 Drawing Sheets

MOBILE TELEPHONE WITH AN ARTICULATED COVER AND WITH ROTARY CONTACTS

BACKGROUND OF THE INVENTION

1 Field of the Invention

The present invention relates to a mobile telephone comprising a housing containing an electrical circuit and carrying a cover fastened to this housing in an articulated i.e., jointed manner and further comprising a microphone.

2 Description of Prior Development

French Patent Application No. 97 00 891 of Jan. 28, 1997 in Applicant's name describes a mobile telephone of the above type, in which rotary contacts are incorporated in one of the two joints connecting the cover to the housing, in order to make electrical connections between the electrical circuit of the housing and the electrical circuit of the microphone.

SUMMARY OF THE INVENTION

The purpose of the present invention is to make improvements to the above described mobile telephone, the object being to increase the reliability of the electrical connection made by the rotary contacts and also to simplify the assembly of the housing and of the cover.

According to the invention, the mobile telephone is characterized in that one of the joints articulating the housing on the cover comprises three contacts integral with the housing, i.e. two lateral contacts and a central contact. Each of the contacts comprise a contact arm. The central contact bears permanently on a conductive element, while the ends of the two lateral contact arms bear elastically on two conductive plates separated by an insulating material and incorporated in part of the joint of the cover. This is in such a way whereby when the cover is rotated the ends of the two lateral contact arms ensure that the electrical connection between the electrical circuit of the housing and the electrical circuit of the microphone is switched.

During the rotation of the cover, the three contacts brush against the conductive plates. This brushing produces a self-cleaning effect, making it possible to ensure that the electrical connection has a high degree of reliability.

Preferably, the two arms of the lateral contacts and the two contact plates on which they bear are symmetrical with respect to the axis of the joint.

The position of the conductive plates with respect to the contact arms is such that, when the cover is folded down onto the housing, the end of one of the lateral contact arms bears on the insulating material contained between the two conductive plates.

Thus, when the cover is closed, no electrical current circulates between the electrical circuit of the housing and the electrical circuit of the microphone carried by the cover.

This avoids premature wear of the battery supplying the appliance when the latter is not being used.

Moreover, when an incoming call arrives, the detection of the opening of the cover as a result of the closing of the electrical circuit of the microphone thus makes it possible to "pick up" the receiver, without a button having to be manipulated.

According to a preferred version of the invention, each contact consists of a piece cut out from a metal sheet and comprises two arms, one forming the contact arm and the second being folded round the base of a first block of insulating material, incorporated in the joint of the housing, and being in contact at its end with the electrical circuit of the housing.

It should be noted that two types of contacts may be used here, namely contacts cut out on edge and bowed flat contacts having a spoon-shaped end.

Such an embodiment makes it possible to reduce the number of components, make mounting easier and increase reliability.

For the same reasons, preferably, the conductive plates each consist of a piece which is cut out from a metal sheet and bent and which is fastened to a second block of insulating material incorporated in the joint of the cover.

According to an advantageous version of the invention, the joint of the housing comprises a frustoconical surface which is centred on the axis of the joint and into which engages a complimentary frustoconical surface of the joint of the cover.

This engagement allows perfect centring of the two parts of the joint and, in particular, of the contact arms with respect to the conductive plates.

Preferably, the other joint articulating the housing on the cover comprises a spring bringing the two abovementioned complementary frustoconical surfaces to bear one on the other, some play being provided between the two parts of the said other joint, in order to make it possible to remove the cover by the compression of the spring and the disengagement of the two complementary frustoconical surfaces.

It is thus easy to demount the cover in order to replace it with a new cover.

DESCRIPTION OF THE DRAWINGS

Other characteristics and advantages of the invention may be gathered from the following description, given as a non-limiting example, with reference to the accompanying figures of which.

DESCRIPTION OF THE PREFERRED EMBODIMENTS

Figure 1:
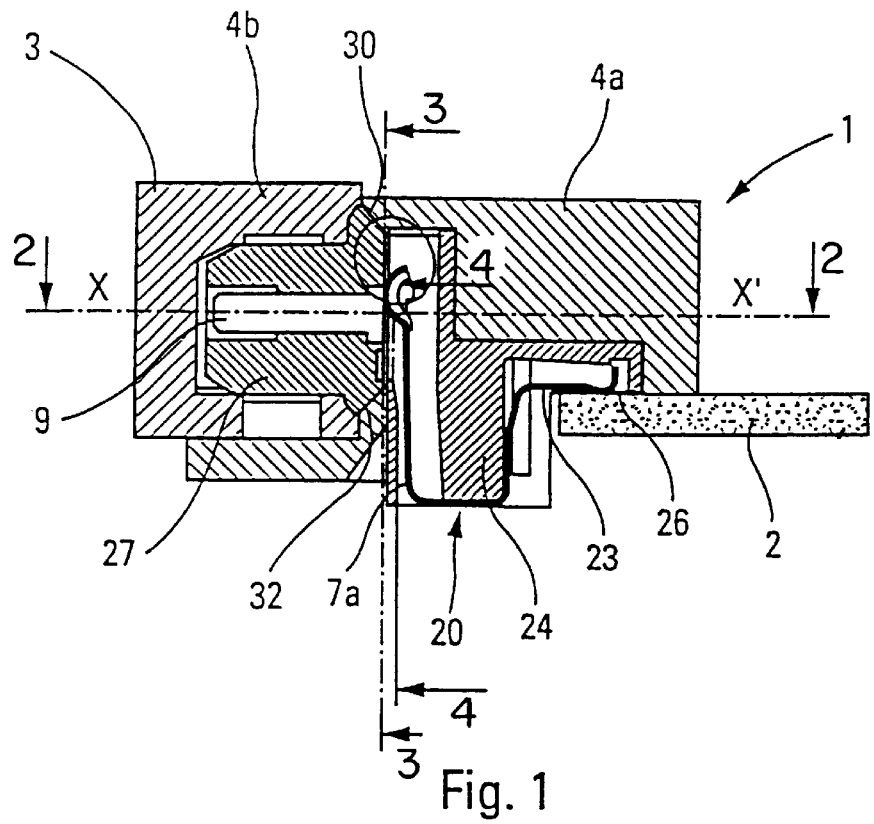
FIG. 1 is a diagrammatic view in vertical section of the joint of the housing of a mobile telephone according to the invention, showing a rotary lateral contact arm incorporated in this joint.

In the embodiment of FIGS. 1 to 4, the mobile telephone comprises a housing 1 containing an electrical circuit 2 and carrying a cover 3 fastened to this housing 1 in an articulated manner and comprising a microphone (not illustrated). Rotary contacts are incorporated in one 4a,4b of the two joints connecting the cover 3 to the housing 1, in order to make electrical connections between the electrical circuit of the housing 2 and the electrical circuit of the microphone.

According to the invention, the joint 4a articulating the housing 1 on the cover 3 comprises three contacts integral with the housing 1, namely two lateral contacts 5a and 5b and a central contact 5c, each comprising a contact arm 7a (7b and 7c respectively), the said central contact 5c permanently bearing this end 7c on a conductive element 9, whilst the ends of the two lateral contact arms 5a and 5b bear elastically on two conductive plates 10 separated by an insulating material 12 and incorporated in the part 4b of the joint of the cover 3. Thus, when the cover 3 is rotated, the said ends of the two contact arms 7a (7b respectively) ensure that the electrical connection between the electrical circuit of the housing 2 and the electrical circuit of the microphone is switched.

Moreover, the contact 5c is offset with respect to the centre of the conductive element 9, so as also to ensure self-cleaning.

In the example illustrated, the two contact arms 7a (7b respectively) and the two contact plates 10 are symmetrical with respect to the axis X–X' of the joint 4a, 4b.

Figure 3:
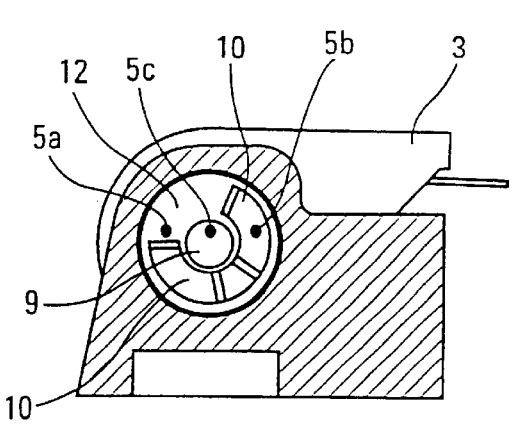
FIG. 3 is a sectional view along the axis A—A of FIG. 1.
Figure 4:
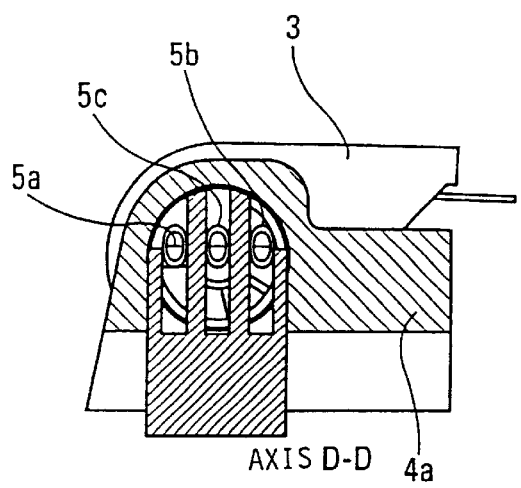
FIG. 4 is a sectional view along the axis D—D of FIG. 1.

The position of the conductive plates 10 with respect to the contact arms 7a (7b respectively) is such that, when the cover 3 is folded down onto the housing 1, the end 7a of one of the contact arms bears on the insulating material 12 contained between the two conductive plates 10, as indicated in FIG. 3.

As may be seen in FIG. 1, each contact consists of a piece 20 cut out from a metal sheet and comprises two arms, one forming the contact arm 7a (7b and 7c respectively), the contact end of which is preferably in the shape of a spoon, the second 23 being folded round the base of a first block 24 of insulating material, incorporated in the joint 4a of the housing 1, and being in contact at its end 26 with the electrical circuit 2 of the housing.

Advantageously, the spoon shape of the ends of the contacts makes it possible, by virtue of a larger diameter, to ensure better contact and, by virtue of its lateral parts, to perform a function of guiding the part 7 in the insulating block.

Figure 8:
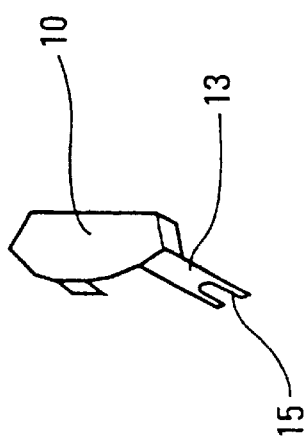
FIG. 8 is a perspective view of an exemplary embodiment of a conductive plate.

As indicated, particularly in an embodiment proposed in FIG. 8, the conductive plates 10 each consist of a piece which is cut out from a bent sheet, made of highly conductive metal, and is fastened to a second block 27 (see FIGS. 1 and 2) of insulating material, incorporated in the joint 4b of the cover 3.

The two conductive plates 10 are applied to one end face of the block 27 of insulating material, and each plate 10 is connected to a tab 13 perpendicular to the plate and extending inside the block 27 of insulating material; each tab 13 is connected electrically to a conductor connected to the electrical circuit of the microphone. For this purpose, the end 15 of each tab 13 is shaped so as to be capable of ensuring the connection with the conductor either by self-baring or by welding or else by subjecting a flexible circuit to compression.

Figure 2:
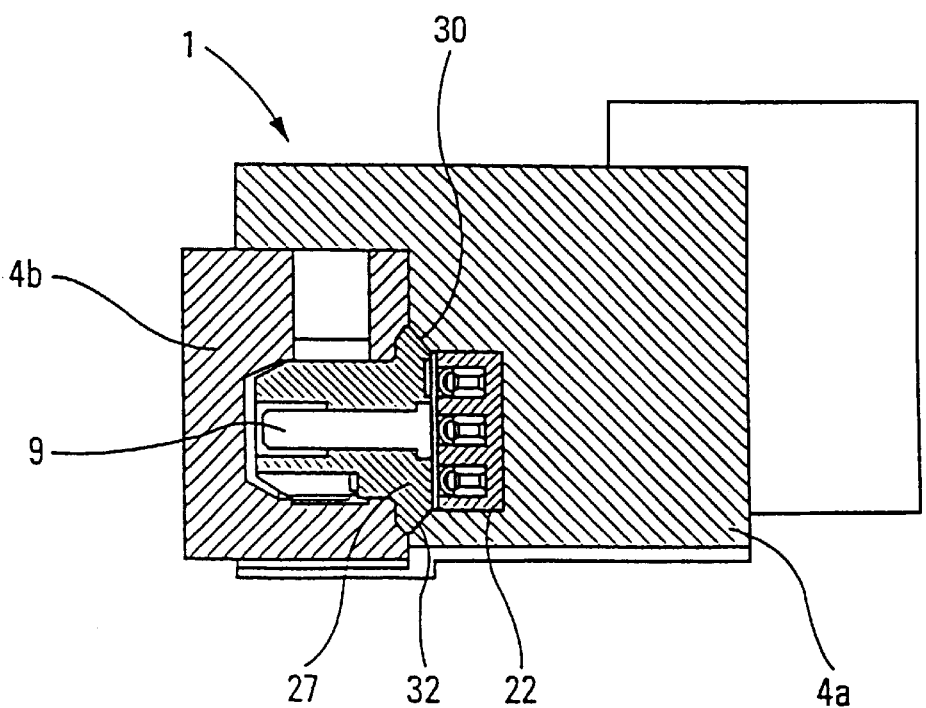
FIG. 2 is a sectional view along the axis B—B of FIG. 1.

FIGS. 1 and 2 show that the joint of the housing 1 comprises a slightly frustoconical surface 30 which is centred on the axis X–X' of the joint and into which engages a complementary frustoconical surface 32 of the joint of the cover 3.

Figure 9:
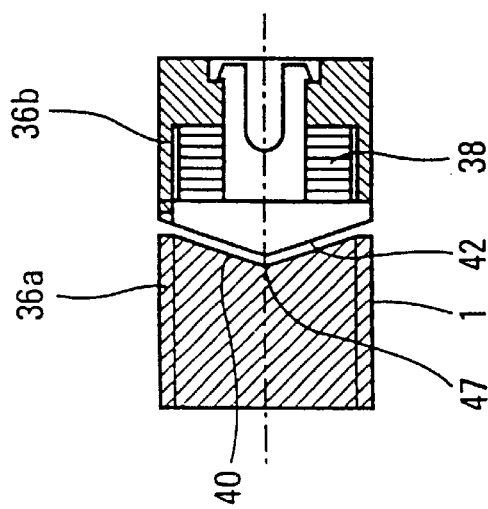
FIG. 9 is a view in axial section of the second joint connecting the housing and the cover of the mobile telephone.

FIG. 9 shows the other joint 36a, 36b articulating the housing 1 on the cover 3. This joint comprises a spring 38 bringing the two abovementioned complementary frustoconical surfaces 30, 32 to bear one on the other.

Some play is provided between the two parts of this other joint 36a, 36b, in order to make it possible to remove the cover 3 by the compression of the spring 38 and the disengagement of the two complementary frustoconical surfaces 30, 32.

Furthermore, the other joint 36a, 36b comprises two surfaces 40, 42 in contact one on the other under the action of the spring 38. One of these surfaces comprises (see FIG. 10) a plurality of angularly offset elevations 44 engaged in depressions 46 formed in the other surface, so as to define a plurality of angular positions of the cover 3 with respect to the housing 1.

Each elevation 44 comprises a vertex 47, an ascending slope and a descending slope which are arranged symmetrically on either side of this vertex.

Figure 10:
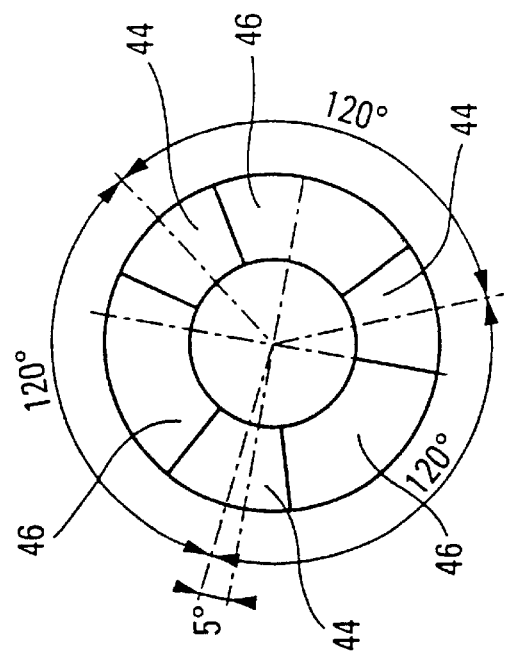
FIG. 10 is a plan view of the surface, illustrated in FIG. 9, articulating the housing on the cover, the said surface being provided with elevations and depressions.

FIG. 10 shows an exemplary embodiment, in which the two surfaces in contact comprise three elevations 44 and three depressions 46 offset relative to one another at an angle of 120°.

The elevations 44 and depressions 46 cooperate with one another to define a first position, in which the cover 3 is folded down onto the housing 1, and a second position, in which the cover 3 forms an angle of about 120° with respect to the housing 1.

This second position corresponds to the normal position of use of the telephone.

Moreover, the position of the elevations 44 and of the depressions 46 is offset slightly (at an angle of 5°) with respect to an origin corresponding to the complete closing of the cover 3, in order to make it possible to displace the latter towards this closing position under the action of the spring 38.

Moreover, the two surfaces in contact 40, 42 can be disengaged one from the other as a result of the compression of the spring 38, thus making it possible to replace the cover 3.

On the other hand, the elevations 44 and the depressions 46 cooperate with one another, to define a position, in which the cover 3 is folded down completely onto the housing 1, and where the contact arms 7 incorporated in the joint 4a do not make the electrical connection between the electrical circuit of the housing 2 and the electrical circuit of the microphone, from this above position and into a first angular position of the cover 3, equal, for example, to 45°. This electrical connection is made when the angular position of the cover 3 is beyond the above first position.

The two contact arms 5a and 5b cooperate with the two conductive plates 10 separated by the non-conductive zone 12.

The position of this non-conductive zone 12 is such that at least one of the two arms 5a, 5b is in contact with this non-conductive zone 12 between the complete closing position of the cover and the first angular position of the latter, mentioned above.

FIG. 3 shows the position of the two contact arms 5a, 5b when the cover 3 is completely closed. One of the arms 5a is located on the insulating plate 12; electrical connection does not take place.

Figure 5:
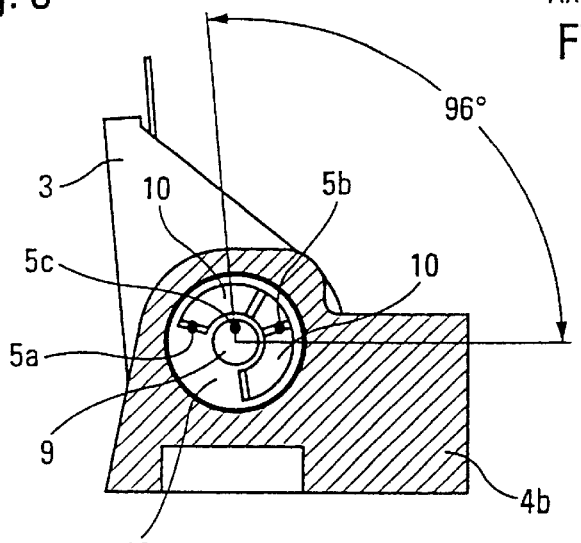
FIGS. 5 to 7 illustrate the position of the contact arms with respect to the conductive plates, for different positions of the cover, on a conductive plate and a non-conductive zone.

FIG. 5 shows the position of the two arms 5a, 5b after the rotation of the cover through 96°. The two arms 5a, 5b are in contact with the conductive plates 10; electrical connection takes place.

Figure 6:
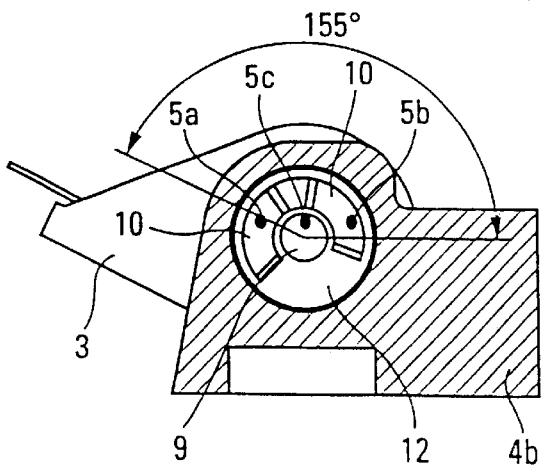
Figure 7:
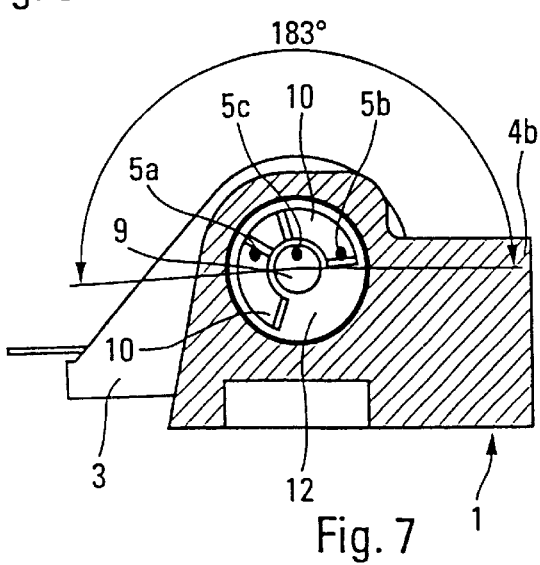

FIGS. 6 and 7 show the position of the two arms 5a, 5b after the rotation of the cover through 155° and 183°; in both cases, electrical connection takes place.

The invention is not, of course, limited to the exemplary embodiments which have just been described, and many modifications can be made to these, without departing from the scope of the invention.

What is claimed is:

1. A mobile telephone comprising a housing containing an electrical circuit and carrying a cover fastened to the housing in an articulated manner and comprising a microphone, rotary contacts being incorporated in one of the two joints connecting the cover to the housing in order to make electrical connections between the electrical circuit of the housing and the electrical circuit of the microphone, wherein one of the joints articulating the housing on the cover comprises three contacts integral with the housing including two lateral contacts and a central contact, each comprising a contact arm, the central contact bearing permanently on a conductive element, while the ends of the two lateral contact arms bear elastically on two conductive plates separated by an insulating material and incorporated in the part of the joint of the cover so that when the cover is rotated, the ends of the two contact arms ensure that the electrical connection between the electrical circuit of the housing and the electrical circuit of the microphone is switched.

2. A mobile telephone according to claim 1, wherein said two lateral contact arms and said two contact plates are symmetrical with respect to the axis X–X' of said joint.

3. A mobile telephone according to claim 1, wherein a position of said conductive plates with respect to said contact arms is such that when said cover is folded down onto said housing, said end of one of said contact arms bears on said insulating material contained between said two conductive plates.

4. A mobile telephone according to claim 1, wherein each of said contacts consists of a piece cut out from a metal sheet and comprises two arms, one forming said contact arm and the second of said arms being folded around a first block of insulating material, incorporated in the joint of said housing, and being in contact at its end with said electrical circuit of said housing.

5. A mobile telephone according to claim 1, wherein said conductive plates each consist of a piece which is cut out from a metal sheet and bent, and which is further fastened to a second block of insulating material incorporated in said joint of said cover.

6. A mobile telephone according to claim 1, wherein said joint of said housing comprises a frustoconical surface which is centred on the axis X–X' of said joint and into which engages a complementary frustoconical surface of said joint of said cover.

7. A mobile telephone according to claim 6, wherein said other joint articulating said housing on said cover comprises a spring bringing said two complementary frustoconical surfaces to bear one on the other, there being some play existing between said two parts of the said other joint, said cover by the compression of said spring and the disengagement of said two complementary frustoconical surface.

8. A mobile telephone according to claim 1, wherein said other joint comprises two surfaces in contact one on the other under the action of said spring, one of these surfaces comprising a plurality of angularly offset elevations engaged in depressions formed in the other surface so as to define a plurality of angular positions of said cover with respect to said housing.

9. A mobile telephone according to claim 8, wherein each elevation comprises a vertex and an ascending slope and a descending slope which are arranged symmetrically on either side of the vertex.

10. A mobile telephone according to claim 8, wherein the position of said elevations and of said depressions is offset slightly with respect to an origin corresponding to the complete closing of said cover in order to make it possible to displace the latter towards the closing position under the action of said spring.

* * * * *